(12) United States Patent
Most

(10) Patent No.: US 10,737,422 B2
(45) Date of Patent: Aug. 11, 2020

(54) DEVICE AND A METHOD FOR FABRICATING A PART BY INJECTION MOLDING

(71) Applicant: SAFRAN AIRCRAFT ENGINES, Paris (FR)

(72) Inventor: Vincent Bernard Serge Most, Le Plessis Robinson (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 329 days.

(21) Appl. No.: 15/618,782

(22) Filed: Jun. 9, 2017

(65) Prior Publication Data
US 2017/0355117 A1 Dec. 14, 2017

(30) Foreign Application Priority Data
Jun. 9, 2016 (FR) .................... 16 55303

(51) Int. Cl.
*B29C 45/37* (2006.01)
*B29C 45/72* (2006.01)
*B29C 45/26* (2006.01)
*F01D 25/24* (2006.01)
*B29C 70/48* (2006.01)
*B29C 33/30* (2006.01)
(Continued)

(52) U.S. Cl.
CPC .......... *B29C 45/376* (2013.01); *B29C 33/308* (2013.01); *B29C 45/2628* (2013.01); *B29C 45/7207* (2013.01); *B29C 70/48* (2013.01); *F01D 25/24* (2013.01); *B29C 45/0025* (2013.01); *B29L 2031/082* (2013.01); *B29L 2031/7504* (2013.01); *F05D 2230/20* (2013.01); *F05D 2300/614* (2013.01)

(58) Field of Classification Search
CPC ...... B29C 33/308; B29C 70/48; B29C 45/376
See application file for complete search history.

(56) References Cited

U.S. PATENT DOCUMENTS 5,421,718 A * 6/1995 Karlsson ............. B29C 45/0017
249/96
5,512,221 A 4/1996 Maus et al.
(Continued)

FOREIGN PATENT DOCUMENTS

| CA | 2 487 738 A1 | 5/2006 |
| WO | WO 2011/131908 A1 | 10/2011 |
| WO | WO 2016/066207 A1 | 5/2016 |

OTHER PUBLICATIONS

French Preliminary Search Report dated Jan. 31, 2017 in French Application 16 55303, filed on Jun. 9, 2016 (with English Translation of Categories of cited documents).
(Continued)

*Primary Examiner* — Nahida Sultana
(74) *Attorney, Agent, or Firm* — Oblon, McClelland, Maier & Neustadt, L.L.P.

(57) ABSTRACT

An injection molding device for fabricating a part, the device including an injection mold, the mold being formed of a support and a countermold that are distinct and that define between them a mold cavity presenting a first shape; and at least one injection device for injecting a fluid material into the mold cavity; the device including deformation elements configured to modify the shape of the mold cavity into a second shape distinct from the first shape.

13 Claims, 5 Drawing Sheets

(51) Int. Cl.
B29L 31/08 (2006.01)
B29C 45/00 (2006.01)
B29L 31/00 (2006.01)

(56) References Cited

U.S. PATENT DOCUMENTS

| | | | |
|---|---|---|---|
| 6,386,504 B1* | 5/2002 | Schemel | B29C 33/308 249/102 |
| 2002/0140120 A1* | 10/2002 | Suzuki | B29C 45/0053 264/40.1 |
| 2005/0264756 A1 | 12/2005 | Esch | |
| 2011/0198770 A1* | 8/2011 | Brown | B29C 45/261 264/40.5 |
| 2016/0059500 A1 | 3/2016 | Hosokawa et al. | |
| 2018/0345564 A1* | 12/2018 | Lefebure | B29C 49/06 |
| 2019/0126566 A1* | 5/2019 | Lehmann Madsen | B29D 99/0028 |

OTHER PUBLICATIONS

David Foreman "Precision Moulding", Professional Engineering, Design Council, 1976, 7 pages.

\* cited by examiner

DEVICE AND A METHOD FOR FABRICATING A PART BY INJECTION MOLDING

BACKGROUND OF THE INVENTION

The invention relates to the field of fabricating injection molded parts. More precisely, the invention relates to an injection molding device and method for fabricating a part that make it possible to avoid potential deformation of the part relative to its expected nominal shape as can occur during solidification (e.g. polymerization) and as observed on extracting the part from the mold.

Existing injection molding methods include in particular the resin transfer molding (RTM) method in which a mold comprises two half-shells that, when placed one against the other, confine a mold cavity. A fiber preform is inserted into the cavity between the two half-molds and then resin is injected into the cavity. The resin is polymerized while keeping the two half-shells closed. Depending on the desired rate of production, polymerization may be performed at ambient temperature or by heating. Such a method can be used to make parts:

that are bodies of revolution, e.g. for fabricating gas turbine fan casings for aeroengines; and parts that are flat, e.g. for fabricating rotor blades.

The use of such a method is particularly advantageous since it makes it possible to obtain parts of overall weight that is less than the same parts would have if they were made of a metal material, while still presenting mechanical strength that is at least equivalent, if not better.

Nevertheless, such parts can also be made using other presently-known injection molding methods, such as plastic injection molding, or indeed molding metal in the context of foundry applications.

Whatever the molding method used, when the part is extracted from the mold, it can happen that it is observed to be deformed compared with its theoretical nominal shape. Thus, by way of example, the following might be observed:

for a body of revolution, such as a fan casing, there can be a defect relative to the desired circular shape, which is presented in the form of ovalization of the part on being extracted from the mold;

for a part that is flat, such as a rotor blade, on being extracted from the mold, there may be a departure from the expected angle of twist, e.g. a reduction in the value of the angle of twist, in other words the blade is warped.

Such defects may be explained in particular by the fact that residual stresses apply to the part during its fabrication in the mold (e.g.: polymerization gradient, winding tension for a part made of composite material), which residual stresses are released when the part is extracted from the mold, thereby leading to deformation of the extracted part.

Generally, such defects are relatively constant and reproducible when using identical fabrication parameters.

Thus, in order to mitigate the problem of deformation in an injection molded part, one common solution consists in making a compensation mold having a mold cavity of a shape that does not correspond to the nominal shape of the part but rather a shape in which the deformation is taken into account so as to obtain, in the end, a part that has its nominal shape after the part has been extracted from the mold.

For example, in order to counter ovalization of a part that is expected to be circular when extracted, a compensation mold may be made in such a manner as to present a mold cavity that is ovalized in a direction perpendicular to a predetermined direction of ovalization that can be expected when the part is extracted from a mold having a cavity that is circular. While in the compensation mold the molded part thus presents a profile that is oval, prior to taking on a circular profile of the expected shape on being extracted.

Nevertheless, making a compensation mold of this type remains an operation that is complex and expensive. For example, the composite materials used for making mechanical parts present properties that depend on numerous factors (e.g.: three-dimensional weaving, winding tension, injection parameters, and polymerization parameters) that cannot always be completely determined from a theoretical point of view by the manufacturers of such parts.

It is thus often not possible to determine the shape of a compensation mold by calculation. Thus, in practice, making a compensation mold is the result of iterative testing, which leads to making a succession of several intermediate molds until the proper shape for compensation is determined empirically.

At present, using such a solution is found not only to be expensive, but also time consuming for producing molded parts.

OBJECT AND SUMMARY OF THE INVENTION

An object of the present invention is to remedy the above-mentioned drawbacks. More precisely, an object of the present invention is to propose a solution that makes it possible to provide a mold that is suitable for compensating the deformation of a part relative to its nominal shape, and to do so without it being necessary to make intermediate molds.

To this end, the invention provides an injection molding device for fabricating a part that is a body of revolution, the device comprising:

an injection mold, the mold being a body of revolution constituted by a support and a countermold that are distinct and that define between them a mold cavity presenting a first shape that is circular; and at least one injection means for injecting a fluid material into the mold cavity;

the device further comprising deformation elements configured to modify the shape of the mold cavity to a second shape that is of oval section and different from the first shape.

Advantageously, the presence of deformation elements for modifying the mold cavity makes it possible to prepare only one mold. By modifying the shape of the mold cavity it becomes possible, in particular, to compensate for any deformation in the fabricated part as extracted from the mold. The shape of such a cavity can thus be controlled into an infinity of configurations by said deformation elements. Consequently, costs in terms of time for making or optimizing such a mold are minimized, since applying a new configuration no longer requires a new mold to be made. Thus, once an optimum configuration has been identified for the deformation elements, this configuration can be conserved for producing molds in series, or indeed for using a single mold having its mold cavity deformed in compliance with the identified optimum configuration.

In an aspect of the mold device, the deformation elements comprise actuators connected to at least one wall of the injection mold.

In another aspect of the mold device, the deformation elements comprise bladders adjacent to deformable diaphragms, said diaphragms defining the outline of the mold cavity.

In another aspect of the mold device, the injection mold has internal heater means comprising a circuit for passing a flow of a heat transfer fluid.

In another aspect, the mold device includes a servo-control system configured to verify and control the state of each deformation element, the servo-control system comprising a computer and a plurality of sensors, the sensors being configured to measure the states of the deformation elements and to communicate these measurements to the computer, the computer being configured to identify any departure of the communicated values from prerecorded values and to control the deformation elements as a function of the results of these comparisons.

The invention also provides an injection molding method for fabricating a part that is a body of revolution by using an injection mold, the mold being a body of revolution formed by a support and a countermold defining between them a mold cavity, the mold cavity presenting a circular first shape that corresponds to a final shape for the part that is to be fabricated, the method comprising:
- a step of injecting a fluid material into the mold cavity so as to form the part; and
- a step of extracting the formed part;
- said method further comprising, before the injection step:
- a step of determining a second shape of oval section for the mold cavity, the second shape being determined as a function of a predetermined deformation of the part when it is extracted from the mold cavity presenting the first shape; and
- a step of modifying the shape of the mold cavity from the first shape to the second shape of the mold cavity.

In an aspect of the molding method, the step of modifying the shape of the cavity is performed by actuators arranged facing outside walls of the injection mold.

In an aspect of the molding method, the step of modifying the shape of the cavity is performed by bladders adjacent to deformable diaphragms, said diaphragms defining the outline of the mold cavity.

In an aspect of the molding method, the part is a part made of composite material obtained by:
- a step of inserting a fiber preform into the mold cavity prior to the injection step;
- a step of injecting a resin as the fluid material; and
- a heating step so as to cause the resin to polymerize.

The invention also provides making a casing or a blade for a turbine engine using the method summarized above.

BRIEF DESCRIPTION OF THE DRAWINGS

Other characteristics and advantages of the invention appear from the following description of particular embodiments of the invention, given as non-limiting examples and with reference to the accompanying drawings, in which.

DETAILED DESCRIPTION OF EMBODIMENTS

Figure 1:
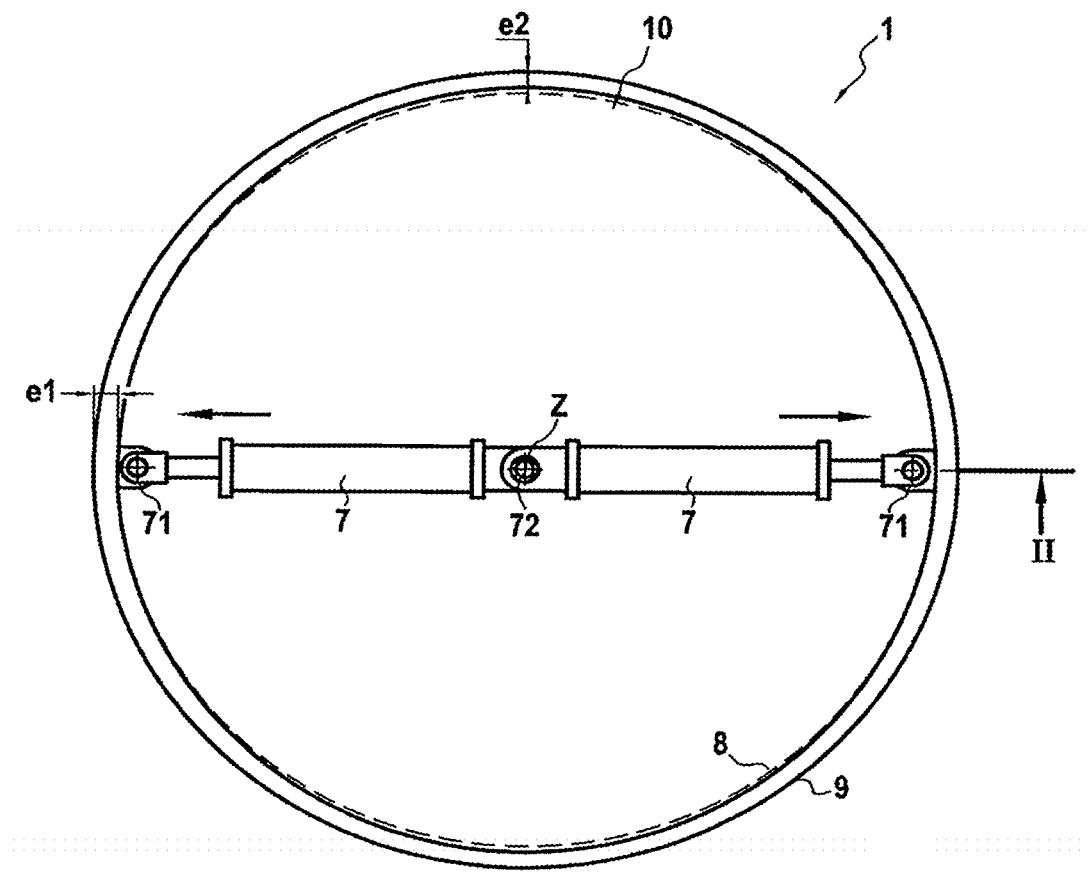
FIG. 1 is a side view of a first embodiment of a molding device comprising in particular an injection mold for fabricating a part that is a body of revolution.

FIG. 1 shows an injection molding device comprising in particular a mold 1 that is a body of revolution, e.g. of circular or cylindrical shape and presenting a section that is annular.

Figure 2:
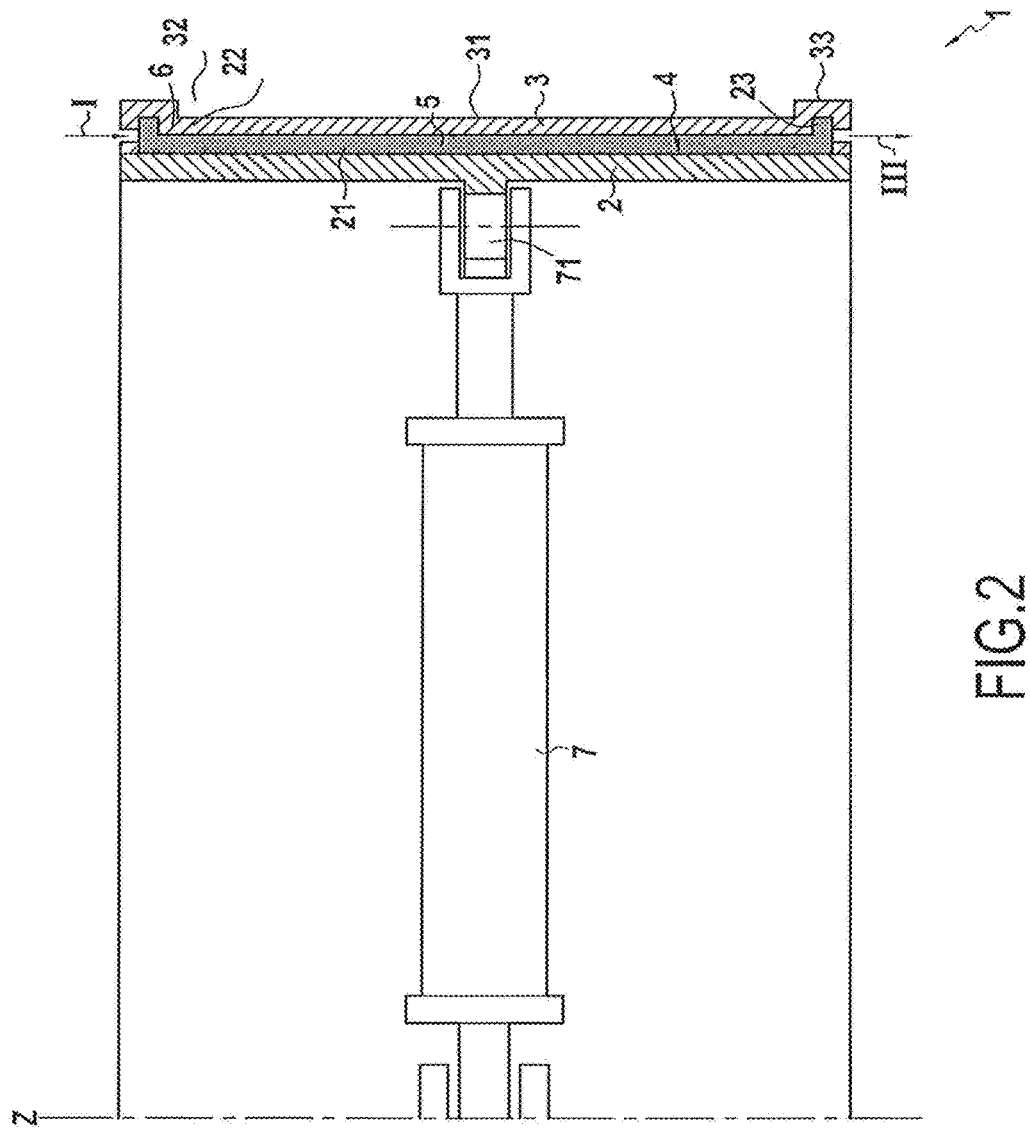
FIG. 2 is a half-view in axial section of the FIG. 1 injection mold on the plane II-II marked in FIG. 1.
Figure 3:
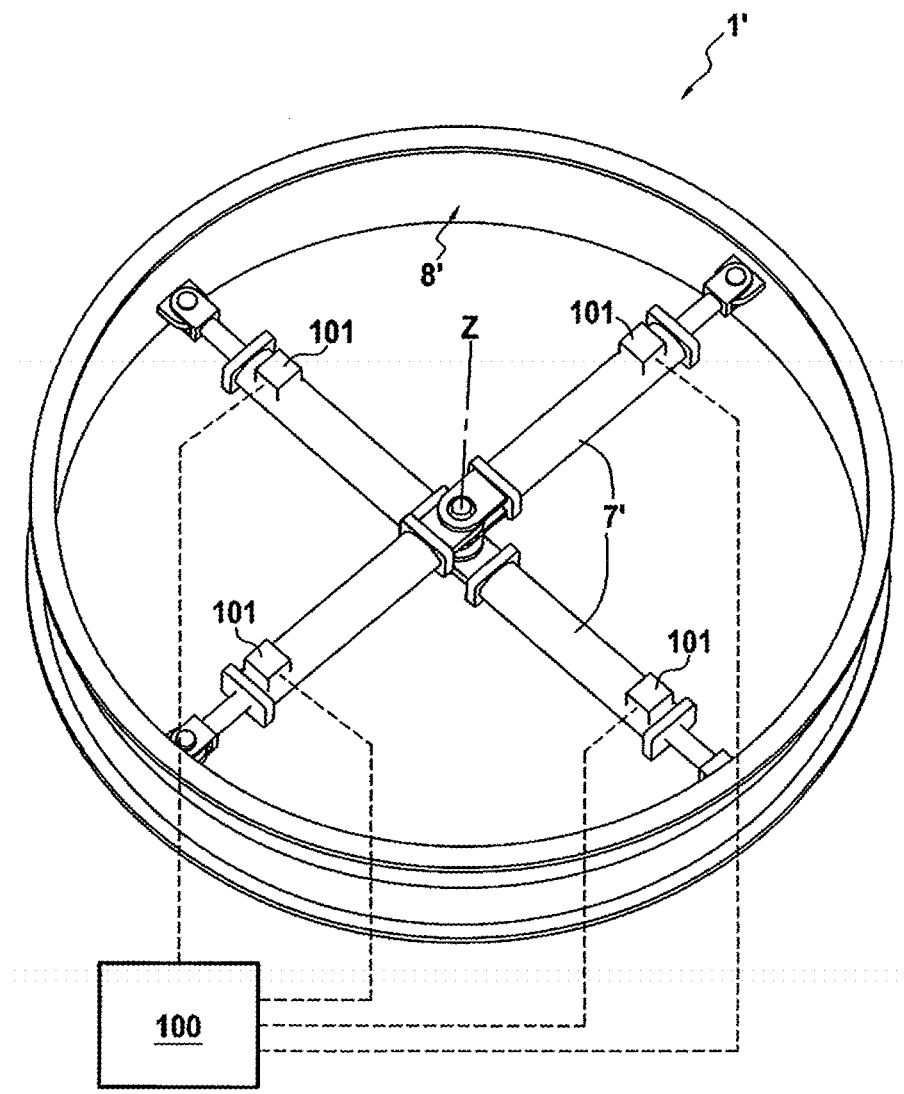
FIG. 3 is a perspective view of a second embodiment of a molding device having deformation elements and for fabricating a part that is a body of revolution.

As can be seen in FIG. 2, which is an axial section on plane II-II of FIG. 1, such a mold 1 is made up of a support 2 and a countermold 3 which between them define a mold cavity 4, which presents a shape that is circular or annular.

The support 2 is to act as a support for a fiber preform 5 of a part that is to be made. By way of example, the preform 5 is a preform made of carbon fibers with three-dimensional or multilayer weaving between warp yarns and weft yarns.

In this example, the support 2 has an outer annular surface with the same profile as the part that is to be made, in this example the surface of a fan casing.

The countermold 3 is placed facing the support 2 of the mold 1 so as to constitute the closed volume of the mold cavity 4. In the example shown, the preform 5 occupies all of the volume of the mold cavity 4. In this example, the preform 5 presents a central portion 21 that is cylindrical together with two transverse flanges 22 and 23 that are to form the flanges of a casing.

Consequently, the countermold 3 that is used has a central portion 31 that is cylindrical, corresponding to the central portion 21 of the preform 5, together with two transverse margins 32, 33 that are made so as to fit around the flanges 21, 22 of the preform 5.

Furthermore, in order to be able to unmold a part that has been made, the countermold 3 is made up of at least two distinct sub-elements that can be assembled together or separated, such as two half-shells.

In another embodiment that is not shown, the support may also have lateral margins on either side of a cylindrical central portion 31, for the purpose of making a part having lateral flanges. The support 2 then has removable sub-elements in order to enable the resulting part to be unmolded.

By way of example, the injection molding device is a resin transfer molding device.

In accordance with existing injection molding methods, the molding device includes means (not shown) for performing injection, which means are represented symbolically in FIG. 2 by a unidirectional arrow I, and they serve to inject a fluid material under pressure into the mold cavity 4 via at least one injection channel 6, possibly with assistance from a vacuum source, as represented symbolically by unidirectional arrow III. By way of example, the injected fluid material may be based on metal, on ceramics, or on plastics material, or indeed it may be a resin for fabricating a part made of organic composite material, as in this example.

In this example, corresponding to resin transfer molding (RTM), the molding device also has heater means for causing the resin to polymerize, with polymerization of the resin serving to make the part out of composite material.

Thus, in this example, inserting the fiber preform 5 into the mold cavity 4 of the mold 1 is followed by injecting the resin by the injection means into the mold cavity 4 via the injection channel 6. Thereafter, resin injection is followed by raising the temperature of the mold 1 so as to heat the resin by using the heater means, which are generally embodied either as a self-heating press or as a stove, thereby enabling the resin to polymerize so as to obtain, on leaving the mold 1, a part that is made out of organic matrix composite material.

In various embodiments, the molding device includes deformation elements configured to apply pressure or traction (e.g. mechanically or by using a fluid), so as to deform the shape of the mold cavity 4. Thus, the deformation elements serve to take the mold cavity 4 from a circular first shape that it presents when at rest, i.e. in the absence of stress exerted by the deformation elements, to a second shape that is oval and determined by the deformation elements.

Advantageously, and as described below, the second shape is determined as a function of the deformation observed on a part when the part is made with a mold 1 while its mold cavity 4 presents a nominal first shape corresponding to the final shape for the part that it is desired to fabricate. As explained above, with this first shape, after the part is extracted from the mold 1, it presents deformation that prevents the part from corresponding to the nominal first shape. Consequently, the second shape of the mold cavity 4 is determined so as to compensate for this deformation and thereby obtain a final part that, once extracted from the mold 1, presents the nominal first shape.

Furthermore, the operation of modifying the mold cavity 4 by the deformation elements is performed prior to injecting the fluid material into the mold cavity 4.

In the embodiment shown in FIG. 1, the deformation elements are actuators 7 that lengthen in directions represented symbolically by arrows, the actuators 7 being arranged facing at least one wall 8 or 9 defining the circumference of the mold 1 that is a body of revolution. The walls 8 and 9 of the mold 1 are made in rigid manner so that only the actuators 7 are suitable for deforming them in order to modify the shape of the mold cavity 4. In particular, the walls 8 and 9 are made so as to conserve their shape while the resin is being injected. In the example shown, each actuator 7 is connected via a first end to a wall 8 of the mold 1 using a respective fastener lug 71. More precisely, the actuators 7 are arranged facing fastener lugs 71, which lugs are secured to the wall 8 defining the inside circumference of the mold 1, which is a body of revolution, i.e. the circumference of the support 2.

Furthermore, the actuators 7 extend radially from the center 72 of the mold 1. For this purpose, and by way of example, each of the actuators 7 is fastened at a second end to a common support shaft passing through the center 72 of the mold 1. The center 72 of the mold 1 is connected to a stationary attachment point that serves to keep the center 72 as a stationary reference point for the mold 1, regardless of the forces exerted by the actuators 7.

Advantageously, the arrangement of the actuators 7 in this first configuration is particularly simple to implement, as contrasted with a possible second configuration in which the actuators are arranged facing a wall 9 defining the outside circumference of the mold 1, i.e. the circumference of the countermold 3.

Specifically, this first configuration does not require the actuators 7 to be secured to a support structure. Furthermore, placing the actuators 7 so that they face the wall 8 defining the inside circumference of the mold 1 avoids any need to remove the actuators after fabricating each part.

In contrast, the second configuration for the actuators 7 would involve fastening each actuator 7 to a support structure and also removing the actuators 7 on each occasion that a fabricated part is extracted in order to enable the various sub-elements of the countermold 3 to be withdrawn.

Nevertheless, it is indeed possible to arrange the actuators 7 facing fastener lugs that are secured to the wall 9 defining the outer circumference of the mold 1.

The actuators 7 serve to exert pressure, or traction, mechanically on the surface of at least one wall 8 or 9 so as to deform the mold 1, and thus indirectly to deform its mold cavity 4. In particular, the arrangement selected for the axial height of the various actuators 7 relative to the mold 1 makes it possible locally to control the depth of deformation of the mold 1 relative to the actuators 7 and to do so with accuracy. The term "axial height" of the actuators 7 is used herein to mean the relative position of each actuator 7 along an axis Z, which axis represents a direction orthogonal to the radial plane of the mold 1. The axis Z is shown in FIGS. 1 to 4. By way of example, the actuators 7 are actuators of hydraulic, pneumatic, or electrical type.

In various embodiments, the three-dimensional arrangement of the actuators 7, such as the axial heights and their angular positions, or indeed their number, is determined as a function of the expected nominal shape for the part, and also as a function of the predetermined deformation relative to the expected nominal shape. By way of example, the predetermined deformation is evaluated either experimentally or by simulation for a mold cavity 4 that presents the nominal shape for the part.

By way of example, if a circularity defect (ovalization) is initially determined for a part extracted from a mold 1 having a mold cavity 4 that is circular or annular in a rest first shape (i.e. in the absence of stresses exerted by the actuators 7), it is possible in a first configuration to arrange a set of actuators 7 in a single common direction, i.e. the direction of the smallest radius of the ovalized part as obtained when using the first shape for the mold cavity 4.

This arrangement of actuators 7 is then used for deforming the mold 1, and thus indirectly its mold cavity 4, towards a second shape that is oval in section, having its major radius crossing the major radius of the ovalized part that would be obtained with the first shape of the mold cavity 4. Even though it presents a section that is oval, this second shape then makes it possible to counter any ovalization of the part when it is extracted, thereby obtaining a part that is substantially circular and that corresponds to the desired nominal shape once it is extracted from the mold 1.

Furthermore, for this first configuration, it is possible to modify locally the stiffness of the mold 1 in at least one predetermined angular zone 10. By way of example, this modification may be achieved by thinning the wall thickness of said predetermined angular zone 10 of the mold 1.

By way of example, in a monodirectional configuration for the actuators 7, FIG. 1 shows a minimum thickness e2 in a zone 10 of thinning that is situated at 90° relative to the axis of the actuators 7 for a mold 1 that is a body of revolution drawn in continuous lines. This mold 1 is shown in comparison with a mold of a body of revolution drawn in dashed lines and presenting a constant thickness e1 greater than e2, and thus a section that is constant in the absence of the zone 10 of thinning.

Advantageously, the presence of at least one zone 10 of thinning makes it easier to deform the mold 1 in said predetermined angular zone, so as to obtain a part having the desired nominal shape on being extracted from the mold 1.

Thus, in this first configuration, as a result of making use locally of thinning zones 10, the mold 1 presents a section that is not constant.

In practice, the predetermined angular zones 10 and the depths of the thinning are determined by digitally simulating the various physical parameters of the mold 1.

The use of angular zones of thinning in the mold 1 can be explained in particular by the fact that using actuators 7 in only a single direction for a mold 1 of constant section cannot suffice to deform the mold 1 sufficiently to obtain the second shape that enables parts to be obtained having the desired nominal shape. Specifically, with a mold 1 of constant section and in the absence of zones of thinning, it is sometimes observed that the mold 1 deforms more in the direction of the actuators 7 than in the direction perpendicular to the actuators 7 (by about 18% in practice).

Figure 4:
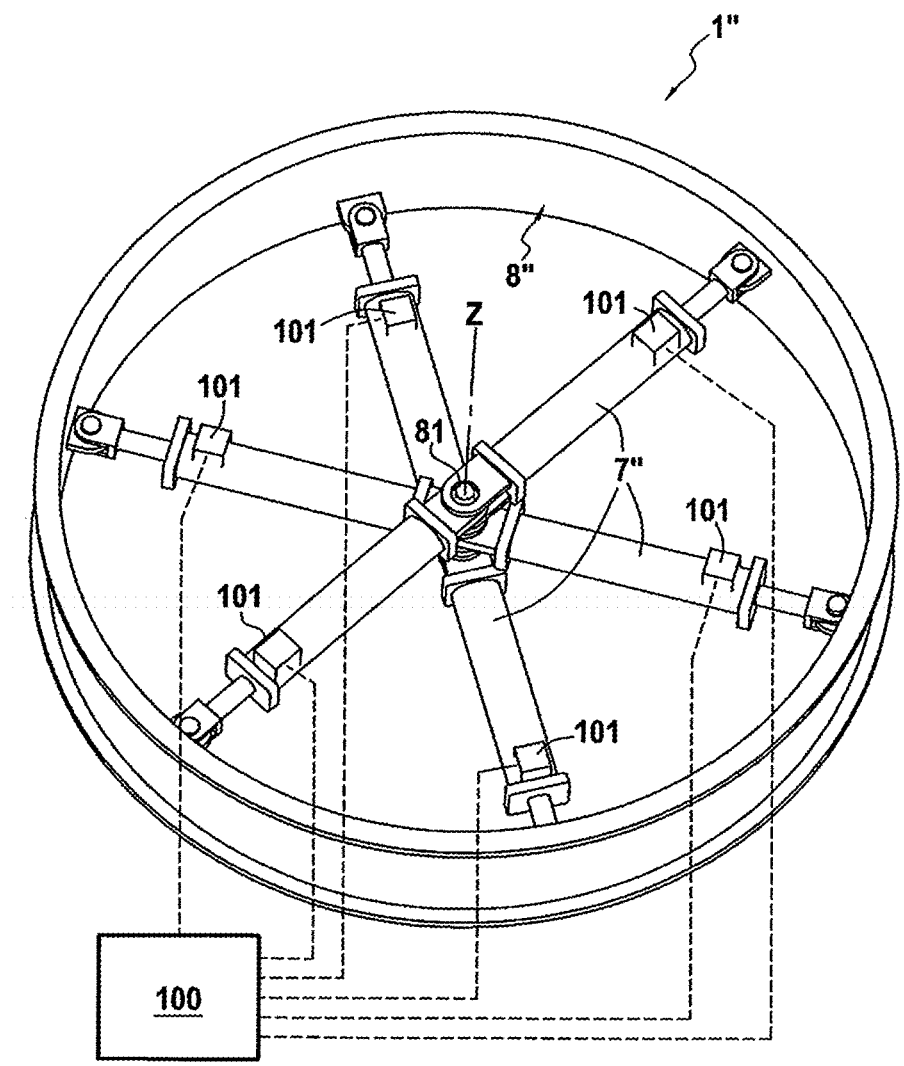
FIG. 4 is a perspective view of another embodiment of a molding device having deformation elements and for fabricating a part that is a body of revolution.

With various other configurations of actuators 7, it is possible:

to arrange the actuators 7' in perpendicular directions. By way of example, in FIG. 3, a set of actuators 7' are arranged mutually perpendicularly facing a wall 8' defining the inside circumference of a mold 1' of a body of revolution. Advantageously, this makes it possible to control the oval deformation of the mold 1' and of its mold cavity with accuracy, along the desired major and minor radii for ovalization. Furthermore, such a configuration does not need a zone 10 of thinning, unlike the above-described monodirectional configuration; and more generally, to arrange the actuators 7" in a plurality of directions, and in a plurality of predetermined angular zones of a mold 1". By way of example, FIG. 4 shows a plurality of actuators 7" arranged relative to one another at various angular differences and facing a wall 8" defining the inside circumference of a mold 1" that is a body of revolution. By way of example, the actuators 7" may optionally be spaced apart at equal angles and/or they may extend radially relative to the center 81 of the mold 1", like the spokes of a wheel fastened to a central hub. Advantageously, the use of a plurality of actuators 7" makes it possible to achieve accurate local control of each angular zone of the mold 1" and of its mold cavity.

Thus, in the above examples, fabricating a part using any type of injection (e.g.: with metal, plastics material, or resin) comprises the following common steps:

determining a second shape for the mold cavity 4 of the mold 1, 1', 1", this second shape being determined as a function of a predetermined deformation of the part when it is extracted from the mold 1, 1', 1" while it presents a mold cavity of a first shape;

modifying the shape of the mold cavity 4 from the first shape to the second shape by using the deformation elements;

using the injection means to inject a fluid material via an injection channel 6 into the mold cavity 4 while it presents the second shape in order to form the part; and extracting the part that has been formed in the mold cavity 4.

Figure 5:
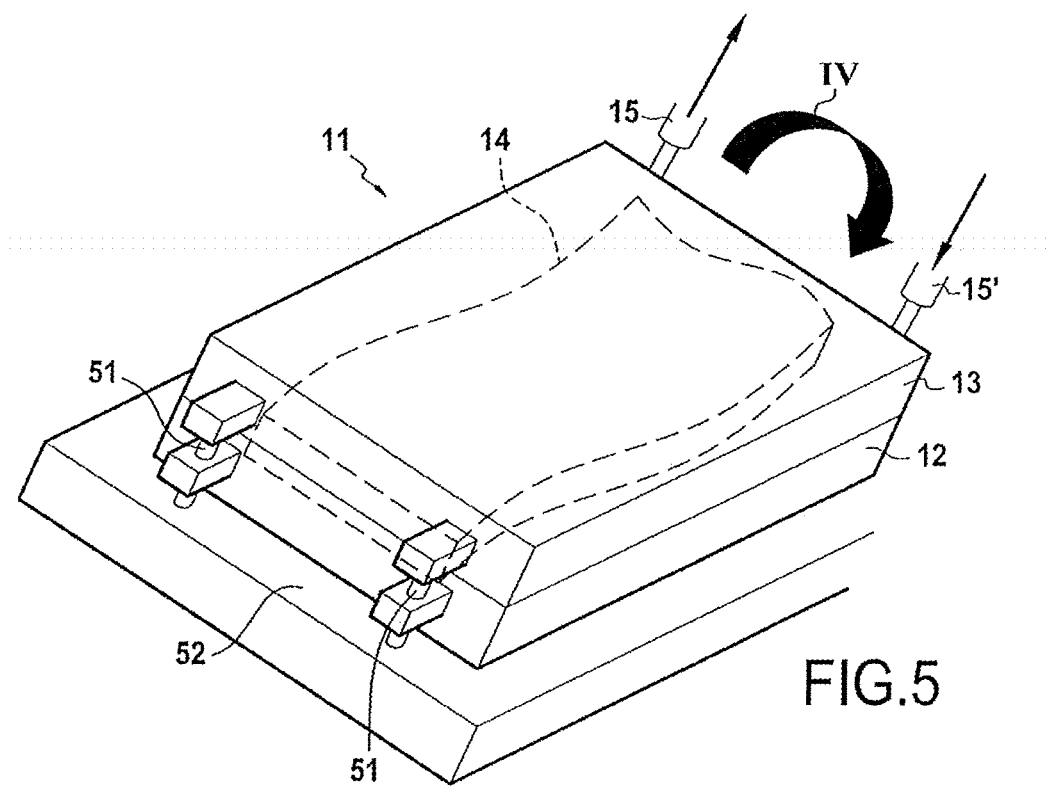
FIG. 5 is a perspective view of another embodiment of a molding device having deformation elements and for fabricating a twisted part.

FIG. 5 shows another embodiment using the above-described actuators as the deformation elements, but this time for forming a twisted part by means of an injection molding method (e.g. using plastics material, metal, or resin). In this figure, the injection mold is a substantially flat mold 11 constituted by a support 12 and by a countermold 13 defining between them a mold cavity (not shown) for fabricating a twisted part 14 such as a rotor blade.

This part 14 is made using one of the above-described injection methods.

In this example, the mold 11 has at least one fastener means 51 at a first end, specifically two fastener means in the example shown, enabling the mold 11 to be held stationary by embedding in a slab 52. At its end opposite from this first end, the mold has a set of actuators 15, 15' suitable for applying twisting to the second end of the mold 11. Preferably, but not necessarily, the connections 51 for embedding the mold 11 are located facing the actuators 15, 15' so as to ensure that the first end is indeed held stationary, making it impossible for the twisting exerted by the actuators 15 and 15' on the second end to be reproduced at this first end.

The action of the actuators 15, 15' for exerting predetermined twisting (curved arrow IV) on the mold 11 is represented by monodirectional arrows symbolizing the directions in which the actuators 15 and 15' apply forces to the mold 11 when they move. In this example, two actuators 15 and 15' apply respective parallel and opposite direction forces to twist the second end of the mold 11. Nevertheless, this number of actuators 15, 15' is given purely by way of illustration, and furthermore the twisting is not necessarily performed by applying opposite forces.

In the absence of twisting exerted by the actuators 15, 15' on the second end of the mold 11, the mold 11 at rest presents a mold cavity having a first shape, which shape corresponds to the nominal shape expected for the part that is to be fabricated When fabricating a twisted flat part 14 such as a rotor blade, extracting the part fabricated using the first shape for the mold cavity leads in practice to a departure from the expected twist angle, as a result of stresses being released.

In order to compensate for this departure, in an embodiment, the actuators 15, 15' apply predetermined twisting to the second end of the mold 11 prior to injecting the fluid material into the mold cavity, so that the mold cavity is deformed towards a second shape.

By way of example, the second shape increases the angle of twist of the part 14 in the mold cavity compared with the nominal angle expected for the part 14.

Thus, after fabricating the part with the second shape in the mold cavity, extracting the part 14 from the mold cavity leads to physical stresses that apply to said part 14 being released, thereby causing the value of its angle of twist to be decreased so that it finally converges towards the expected nominal angle of twist.

It can thus be understood that because of the twisting exerted by the actuators 15, the part 14 to be fabricated adopts the second predetermined shape in the mold cavity and subsequently, on being extracted, converges towards the first shape, i.e. the expected nominal shape.

Furthermore, for the various configurations of actuators 7, 7', 7", 15, 15' as described above, when the molded part is fabricated using a resin transfer method, the means for heating the mold 1, 1', 1", 11 may be constituted by the mold itself, so that the mold is a self-heating mold. By way of example, the self-heating property of the mold may be obtained by providing a circuit within the mold for passing a flow of heat transfer fluid. Advantageously, unlike a standard mold that is commonly placed in a stove in order to heat it, using a self-heating mold 1, 1', 1", 11 makes it possible to avoid heating the actuators 7, 7', 7", 15, 15' in any way, which would run the risk of causing them to expand and thus make them more complicated to control.

Figure 6:
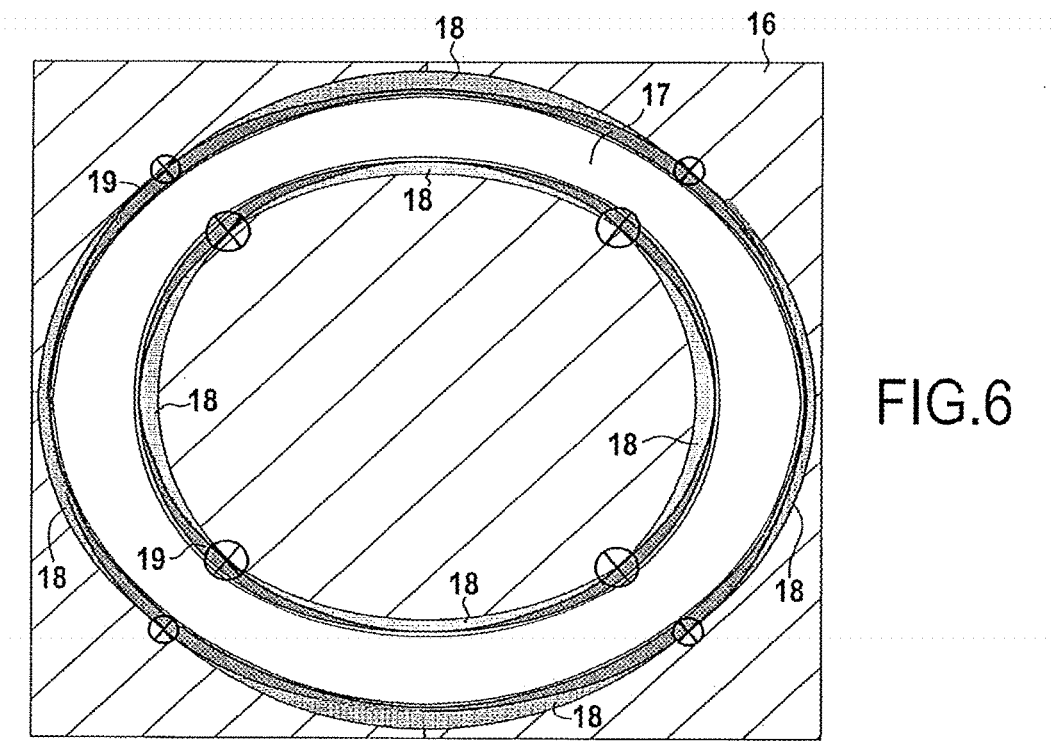
FIG. 6 is a section view of another embodiment of a molding device having deformation elements and for fabricating a part that is a body of revolution.

FIG. 6 shows another embodiment of deformation elements for deforming a mold 16. By way of example, the mold 16 shown is a mold 16 that is a body of revolution, presenting a mold cavity 17 that is circular.

In this embodiment, the deformation elements are constituted by a predetermined number of bladders 18 adjacent to two deformable diaphragms 19 defining the outlines of the mold cavity 17. Each bladder 18 may be independently subjected to a fluid under pressure, thereby enabling its expansion to be controlled, and thus enabling fluid pressure to be applied against the adjacent diaphragm 19.

Thus, by controlling the expansion of each bladder it is possible to control the deformation of the adjacent diaphragm 19 locally, i.e. in at least one predetermined angular zone, and thus control the deformation of the mold cavity 17.

In the example shown, each diaphragm 19 has a stationary angular zone, i.e. a zone of non-deformable thickness, defining the separations between the bladders 18. These separations are symbolized in this figure by crosses. Thus, in this example, each diaphragm 19 may be deformed by four bladders 18 corresponding thereto.

In this embodiment, as above, if a departure from circularity, such as ovalization, is initially observed in a part extracted from the mold 16 having a mold cavity 17 with a first shape while at rest (i.e. in the absence of stresses exerted by the bladders 18), it is possible to control the bladders 18 so as to deform the mold cavity 17 towards a second shape of oval section in which the major radius lies across the major radius of the ovalized part as obtained while using the first shape for the mold cavity 17. Even though this second shape presents a section that is oval, it makes it possible once more to compensate for any ovalization of the part on being extracted, so as to end up obtaining from the mold 16 a part that is substantially circular, corresponding to the desired nominal shape.

In the example shown, the mold cavity 17 can be seen to be ovalized by using four bladders 18 that are respectively adjacent to two diaphragms 19, these diaphragms 19 defining respectively the inside circumference and the outside circumference of the mold cavity 17. Nevertheless, it is possible to adapt the number of bladders 18, and it will readily be understood that a larger number of bladders 18 serves to improve the accuracy of the deformation that is exerted locally on each of the diaphragms 19.

In another embodiment that is not shown, the deformable diaphragms 19 define the outlines of the mold cavity 17, but they are not associated with adjacent bladders. A fluid under pressure, e.g. air under pressure, is caused to flow between walls defining the outlines of the mold and the deformable diaphragms 19 enables the deformation of each deformable diaphragm 19 to be controlled, and thus enables the deformation of the mold cavity 17 to be controlled.

Furthermore, with reference to the various embodiments described above, in order to be able to control each deformation element independently, the mold device has a servo-control system configured to verify and control the state of each deformation element, e.g. the extension of each actuator 7, 7', 7", 15, 15', or the inflation of each bladder 18.

When the deformation elements are actuators 7, 7', 7", 15, 15', the servo-control system may be constituted by way of example by a computer 100 communicating (dashed lines in FIGS. 3 and 4) with a plurality of position sensors 101 deployed on the actuators, and possibly also deployed at a plurality of predetermined angular positions on the mold 1, 1', 1", 11.

By way of example, the position sensors 101 may be of the linear coder type and they may be deployed on each actuator 7, 7', 7", 15, 15' so as to measure its respective extension value. Advantageously, the measured extension value of each actuator enables the computer 100 to deduce indirectly, e.g. on the basis of a table of measurements, the deformation of the mold in association with said corresponding actuator.

The measurements are returned, e.g. periodically, to the computer 100 which then compares each return value with a setpoint value for a prerecorded model. The return measurements thus relating to the real extensions of the actuators 7, 7', 7", 15, 15' as measured are compared with setpoint values in a measurement table, giving theoretical extensions for obtaining a mold cavity with a predetermined desired shape. In the event of any departure in the extension of an actuator being observed compared with its theoretical extension, the computer 100 controls (extends or retracts) the actuator in question so as to cause it to converge from its current extension towards its optimum theoretical extension.

Furthermore, it is also possible to place position sensors 101 directly at different angular positions of the mold 1, 1', 1", 11 in order to measure its deformation directly, and to evaluate indirectly the shape of the mold cavity. Once more, these measurements are communicated to the computer 100, which compares them with setpoint values for a prerecorded model relating to a predetermined shape for the mold cavity, and then as a function of the result of this comparison, the computer optionally controls one or more actuators 7, 7', 7", 15, 15' so as to cause the mold cavity to converge towards a desired shape.

In another example, if the deformation elements are bladders 18, the position sensors 101 may be flow sensors measuring the flow rate of the fluid flowing through each bladder 18. Advantageously, this enables the computer 100 to evaluate indirectly the inflation state of each bladder 18. The flow measurements from the various position sensors 101 are returned, e.g. periodically, to the computer 100 which compares them with setpoint values for the flow rates of a prerecorded model relating to a mold cavity 17 having a desired predetermined shape. As a function of any departure of the values observed during this comparison step, the computer 100 adapts the flow of the fluid under pressure flowing through one or more bladders 18 so as to control the deformation of the mold cavity 17 and cause its shape to converge towards the desired shape.

Advantageously, the above-described embodiments apply generally to a part of any shape obtained by using an injection molding method, such as parts that are substantially flat or that are bodies of revolution. As non-limiting examples, the embodiments described relate to fabricating a fan casing or a turbine engine blade.

The invention claimed is:

1. An injection molding device for fabricating a part that is a body of revolution, the device comprising:
   an injection mold, the mold being a body of revolution constituted by a support and a countermold that are distinct and that define therebetween a mold cavity presenting a first shape that is circular, the support including a first wall defined by a first plane curve rotated around an axis of revolution, and the countermold including a second wall defined by a second plane curve rotated around the axis of revolution; and
   an injecting device which injects a fluid material into the mold cavity; and
   deformation elements configured to modify the shape of the mold cavity to a second shape that is of oval section and different from the first shape.

2. The molding device according to claim 1, wherein the deformation elements comprise actuators connected to at least one of the first wall or the second wall of the injection mold.

3. The molding device according to claim 1, wherein the deformation elements comprise bladders adjacent to deformable diaphragms, said diaphragms defining an outline of the mold cavity.

4. The molding device according to claim 1, wherein the injection mold includes a heater internal to the injection mold comprising a circuit for passing a flow of a heat transfer fluid.

5. The device according to claim 1, further comprising a servo-control system configured to verify and control a state of each deformation element, the servo-control system comprising a computer and a plurality of sensors, the plurality of sensors being configured to measure the states of the deformation elements and to communicate the measured states of the deformation elements to the computer, the computer being configured to compare the measured states of the deformation elements to prerecorded values and to control the deformation elements as a function of the comparison.

6. An injection molding method for fabricating a part that is a body of revolution by using an injection molding device including an injection mold, the mold being a body of revolution constituted by a support and a counter mold that are distinct and that define there between a mold cavity presenting a first shape that is circular, the support including a first wall defined by a first plane curve rotated around an axis of revolution, and the counter mold including a second wall defined by a second plane curve rotated around the axis of revolution; an injecting device which injects a fluid material into the mold cavity; and deformation elements configured to modify the shape of the mold cavity to a second shape that is of oval section and different from the first shape, the method comprising:
   determining the second shape of oval section for the mold cavity, the second shape being determined as a function of a predetermined deformation of the part when the part is extracted from the mold cavity presenting the first shape that is circular;
   modifying the shape of the mold cavity from the first shape to the second shape of the mold cavity using the deformation elements;
   injecting a fluid material into the mold cavity so as to form the part; and
   extracting the formed part.

7. The injection molding method according to claim 6, wherein the the deformation elements comprise actuators connected to at least one of the first wall or the second wall of the injection mold.

8. The injection molding method according to claim 6, wherein the deformation elements comprise bladders adjacent to deformable diaphragms, said diaphragms defining an outline of the mold cavity.

9. The method according to claim 6, wherein the part is a part made of composite material,
   wherein the method further comprises inserting a fiber preform into the mold cavity prior to the injecting,
   wherein a resin is injected as the fluid material, and
   wherein the method further comprises heating so as to cause the resin to polymerize.

10. The molding device according to claim 1, wherein the first wall is an inner circumferential wall of the injection mold, and the second wall is an outer circumferential wall of the injection mold.

11. The molding device according to claim 10, wherein the deformation elements comprise actuators connected to the first wall of the injection mold.

12. The molding device according to claim 11, further comprising a servo-control system configured to verify and control a state of each deformation element, the servo-control system comprising a computer and a plurality of sensors provided on the actuators and configured to measures states of the actuators.

13. The molding device according to claim 1, wherein the countermold includes a cylindrical central portion and first and second transverse margins at ends of the central portion.

* * * * *